V. M. MONTSINGER.
TEMPERATURE INDICATOR FOR TRANSFORMERS AND THE LIKE.
APPLICATION FILED MAY 27, 1918.

1,371,923.  Patented Mar. 15, 1921.

Inventor:
Vincent M. Montsinger,
by
His Attorney.

UNITED STATES PATENT OFFICE.

VINCENT M. MONTSINGER, OF PITTSFIELD, MASSACHUSETTS, ASSIGNOR TO GENERAL ELECTRIC COMPANY, A CORPORATION OF NEW YORK.

TEMPERATURE-INDICATOR FOR TRANSFORMERS AND THE LIKE.

1,371,923.

Specification of Letters Patent. Patented Mar. 15, 1921.

Application filed May 27, 1918. Serial No. 236,961.

*To all whom it may concern:*

Be it known that I, VINCENT M. MONT-SINGER, a citizen of the United States, residing at Pittsfield, in the county of Berkshire, State of Massachusetts, have invented certain new and useful Improvements in Temperature-Indicators for Transformers and the like, of which the following is a specification.

My invention relates to a temperature indicator for transformers and the like, and it has for its object the improvement of a device of this character.

It is well known that transformers, and other similar apparatus, develop heat during their operation, and that there will be a point within the transformer or other device known as the hot spot where the temperature is higher than at any other point, and since the temperature of no part of the transformer may safely exceed a certain predetermined value, the capacity of the transformer is limited by the temperature attained by this hot spot. This spot, however, is usually located within the windings and its temperature therefore, cannot be determined by the use of the ordinary thermometer, and the temperature of the exterior parts of the apparatus or of the oil when the apparatus is immersed in oil, affords no certain or accurate indication of the temperature of the hot spot. In order, therefore, to operate a transformer with safety, it is usually necessary to keep the temperature of the hot spot as determined by the operator considerably below the permissible hot spot temperature; otherwise, the actual hot spot temperature is likely to pass the permissible temperature with consequent injury to the transformer.

In accordance with my invention the temperature of the interior of the windings is determined by one or more resistance windings wound together with, and inductively related to the main windings of the transformer or other apparatus and disposed in the portion corresponding to the hot spot and an indicator is provided which responds to variations in the temperature and resistance of the resistance winding.

Figure 1:
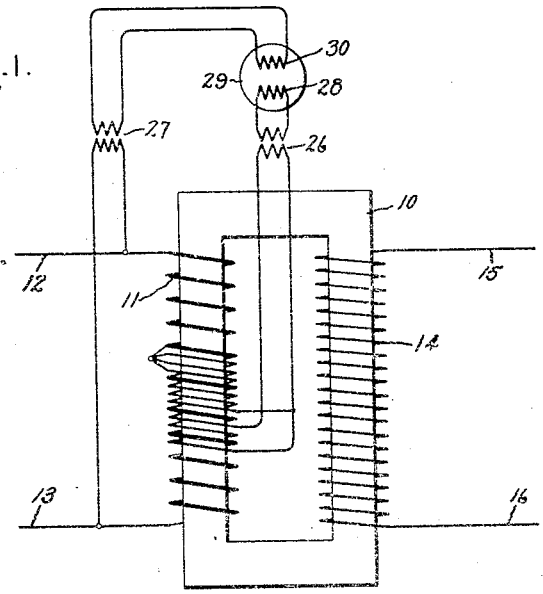
Figure 2:
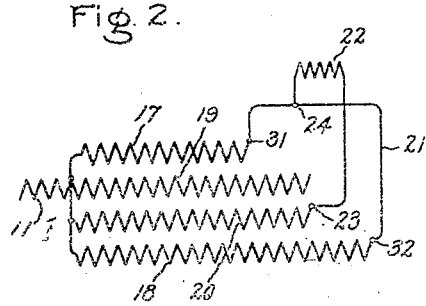

For a better understanding of my invention reference may be had to the accompanying drawing in which Figure 1 is a diagrammatic view illustrating my invention used in connection with a transformer; and Fig. 2 is a diagrammatic view further illustrating certain parts of the circuits.

Referring now to the drawings and first to Fig. 1, 10 is the core of a transformer, or other like apparatus, on which is disposed a primary winding 11 connected to supply conductors 12 and 13 and a secondary winding 14 connected to a load circuit represented by the conductors 15 and 16. A resistance winding 17, more clearly shown in Fig. 2, having a substantial temperature coefficient (either positive or negative, but in this application assumed to be positive) is connected at one end to a suitable point on the main winding 11, and being wound with the main winding is in inductive relation therewith, and is in such close thermal relation to the main winding that it assumes substantially the same temperature as the main winding. This resistance member preferably has a less number of turns, for example, one less turn, than a selected portion 19 (see Fig. 2) of the main winding 11 of the transformer. In the preferred form of my invention, a second resistance member 18, which is formed of a material having zero temperature coefficient, is also disposed between the main windings and has a greater number of turns, for example, one more turn than the main winding 19. This resistance member is also connected to the main winding 11 and its free end is connected by a conductor 21 to the free end of the resistance winding 17. A third resistance member 20 is also wound between the main windings and is connected through the primary winding 22 of an insulating transformer 26, to the conductor 21 between the terminals of the resistance members 17 and 18. It is apparent that the windings 17 and 18 form two legs of a Wheatstone bridge, the primary winding 22 and the winding 20 being connected in series across equipotential points of the bridge at some chosen temperature which is the temperature at which the resistance of 17 and 18 are equal. The insulating current transformer 26 which is interposed between the windings of the transformer and the indicating instrument, effectually insulates the latter from the transformer and makes the instrument safe for the operator.

The secondary winding of the insulating transformer is connected to the current coil 28 of the instrument 29, which is in effect, a wattmeter. A voltage coil 30 is also provided for the instrument for polarizing the same and is connected to the supply conductors 12 and 13 through the voltage transformer 27, which steps down the line voltage to a value suitable for the instrument 29.

The operation of the device shown in Figs. 1 and 2 is as follows:

Inasmuch as the winding 18 has a greater number of turns than does the winding 17, a higher voltage will be induced in the winding 18 than in the winding 17 and there will be a difference of potential between the points 31 and 32 which are located at the ends of the resistance members 17 and 18, respectively and a current will circulate through the circuit which includes the windings 17—18 and the conductor 21. Since the windings 17 and 18 are so closely interrelated the circuit will be non-inductive and the circulating current will be limited only by the resistances of 17 and 18. The windings are so arranged that at the normal temperature of the transformer, say at 100 degrees C., the voltages of the points 23 and 24 will be the same. The windings may readily be so arranged, since the winding 20 has a number of turns intermediate between the turns of the windings 17 and 18. Now if the temperature of the device increases beyond 100 degrees, the resistance of the winding 17 will be raised while the resistance of the winding 18 does not change with the consequence that the voltage of the point 24 will be raised relatively to the point 23 and a current caused to circulate through the primary winding 22, thereby setting up a current in the current coil 28 of the wattmeter, and the hand of the instrument will turn to the right. Inasmuch as the temperature change is a function of the resistance of the member 17, the wattmeter may be calibrated in degrees. Since there is no current in the primary winding 22 at the normal working temperature, say at 100 degrees C., and since this calibration should be on the point of zero torque of the scale, the hand of the instrument will normally point to an intermediate part of the scale. On an increase in temperature, the hand will be moved to the right (in a standard type of instrument) and on a decrease in temperature, the hand will move to the left of the 100 degree point. Since, by making the resistance of 17 equal, say at 100 degrees C., to the constant resistance 18, there will be no current flowing in the primary winding 22 and hence no torque at this particular temperature which is the normal working temperature, a change in the voltage of the main transformer will not affect the reading of the temperature meter. However, as the temperature falls below or exceeds 100 degrees C., the reading will, of course, be more and more affected by a change in the voltage, but this error is least or practically negligible around and near the normal working temperature.

While I have herein shown and described one form of my invention, I do not desire to be limited to the exact arrangement shown and described but seek to cover in the appended claims all those modifications which come within the true spirit and scope of my invention.

What I claim as new and desire to secure by Letters Patent of the United States is:—

1. In combination, an inductive device comprising a winding, a resistance member having a substantial temperature coefficient and disposed in inductive relation to said winding, and means responsive to the E. M. F. of the circulating current induced in said resistance member for indicating the variations in temperature of said resistance member.

2. In combination, an inductive device comprising a winding, a resistance member having a substantial temperature coefficient wound together with said winding and in inductive relation thereto, and means responsive to the E. M. F. of the circulating current induced in said resistance member for indicating the variations in temperature in said resistance member.

3. In combination, an inductive device comprising a winding, a Wheatstone bridge having two of its arms disposed in inductive relation to said winding and having different temperature coefficients, and means for indicating the changes in the resistance of said arms when the temperature varies.

In witness whereof, I have hereunto set my hand this 22nd day of May 1918.

VINCENT M. MONTSINGER.